(12) United States Patent
Kulkarni et al.

(10) Patent No.: US 12,212,270 B2
(45) Date of Patent: Jan. 28, 2025

(54) MOTOR CONTROLLER AND A METHOD FOR CONTROLLING A MOTOR

(71) Applicant: TEXAS INSTRUMENTS INCORPORATED, Dallas, TX (US)

(72) Inventors: Sameer Pradeep Kulkarni, Bangalore (IN); Prasad Kulkarni, Bengaluru (IN); Ganapathi Hegde, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 236 days.

(21) Appl. No.: 17/369,000

(22) Filed: Jul. 7, 2021

(65) Prior Publication Data

US 2023/0014063 A1 Jan. 19, 2023

(51) Int. Cl.
*H02K 29/12* (2006.01)
*H02P 6/182* (2016.01)
*H02P 6/28* (2016.01)

(52) U.S. Cl.
CPC ............... *H02P 6/28* (2016.02); *H02P 6/182* (2013.01)

(58) Field of Classification Search
CPC .................................. H02P 6/28; H02P 6/182
USPC ..................................................... 318/400.037
See application file for complete search history.

(56) References Cited

U.S. PATENT DOCUMENTS

| | | | | |
|---|---|---|---|---|
| 2008/0265808 A1* | 10/2008 | Sparey | ................... | H02P 6/182 323/263 |
| 2010/0139333 A1* | 6/2010 | Maekawa | ............ | H02K 1/2791 318/718 |
| 2015/0311845 A1* | 10/2015 | Nagata | ................... | H02P 21/26 318/400.02 |
| 2015/0372630 A1* | 12/2015 | Ishikawa | ................. | H02P 21/18 318/400.02 |
| 2020/0249648 A1* | 8/2020 | Raja | ........................ | G05D 3/10 |
| 2021/0218357 A1* | 7/2021 | Li | .......................... | B62D 5/046 |

OTHER PUBLICATIONS

Bist, Vashist; "Field Oriented Control (FOC) Made Easy for Brushless DC (BLDC) Motors using TI Smart Gate Drivers"; Application Brief; Texas Instruments; Jan. 2018; SLVA939B.

(Continued)

*Primary Examiner* — Erick D Glass
(74) *Attorney, Agent, or Firm* — Valerie M. Davis; Frank D. Cimino

(57) ABSTRACT

A motor controller that is operable to control a motor includes drive current generation circuitry having an output coupled to the motor. The motor controller further includes a velocity control path. The velocity control path includes angular velocity estimation circuitry having an input adapted to be coupled to the motor, a velocity comparator having first input coupled to a target velocity input and a second input coupled to an output of the angular velocity estimation circuitry, and an adaptive velocity controller having a first input coupled to an output of the velocity comparator and having an output coupled to a first input of the drive current generation circuitry. The motor controller further includes controller parameter determination circuitry having a first input coupled to the output of the angular velocity estimation circuitry and having an output coupled to a second input of the adaptive velocity controller.

13 Claims, 11 Drawing Sheets

(56) References Cited

OTHER PUBLICATIONS

Infineon; "Sensorless Field Oriented Control with Embedded Power SoC"; Application Note; Mar. 9, 2020; Z8F68474109.
Akin, Bilal et al.; "Sensorless Field Oriented Control of 3-Phase Permanent Magnet Synchronous Motors"; Texas Instruments; C2000 Systems and Applications Team; Mar. 2011; SPRABY9.
Texas Instruments; "Low-Voltage, 50—A Sensorless FOC for Brushless DC or Permanent-Magnet Synchronous Motors Reference Design"; TI Designs TIDM-1003; Jun. 2017; TIDUD29.
Frick, Charles; "Brushless DC Motors Introduction for Next-Generation Missile Actuation Systems Outline"; Analog Devices, Inc.; 2018.

* cited by examiner

MOTOR CONTROLLER AND A METHOD FOR CONTROLLING A MOTOR

BACKGROUND

Electric motors include a rotor and a stator having a plurality of windings. Brushless direct current (BLDC) motors are electronically commutated, wherein solid-state switching replaces the brushes and segmented commutators of traditional permanent magnet DC motors. In some BLDC motors, the rotor is or includes a permanent magnet. These permanent magnet BLDC motors operate by sequentially energizing the windings to attract or repel the permanent magnet rotor into rotational motion. Sensor-less BLDC motors often rely on back electromotive force (BEMF) detection to determine the angular position of the permanent magnet rotor.

SUMMARY

In one example, a motor controller that is operable to control a motor includes drive current generation circuitry having an output coupled to the motor. The motor controller further includes a velocity control path. The velocity control path includes angular velocity estimation circuitry having an input adapted to be coupled to the motor, a velocity comparator having first input coupled to a target velocity input and a second input coupled to an output of the angular velocity estimation circuitry, and an adaptive velocity controller having a first input coupled to an output of the velocity comparator and having an output coupled to a first input of the drive current generation circuitry. The motor controller further includes controller parameter determination circuitry having a first input coupled to the output of the angular velocity estimation circuitry and having an output coupled to a second input of the adaptive velocity controller.

In one example, a method for determining a stall current used for driving a motor at a predetermined velocity is described. The method includes using an open loop target current and an open loop commutation angle to drive the motor at the predetermined velocity in an open loop control mode. The method includes monitoring for a stall condition. The method includes decreasing the open loop target current until the stall condition is detected. The method includes determining the stall current based on the open loop target current when the stall condition is detected.

In one example, a method for controlling a motor having a rotor is described. The method includes determining an estimated angular velocity of the rotor. The method includes determining a set of controller parameters based on the estimated angular velocity and a plurality of mechanical parameters of the motor. The method includes generating a velocity control signal based on the set of controller parameters and a difference between a target velocity and the estimated angular velocity. The method includes generating a driving current for driving the motor based on the velocity control signal.

BRIEF DESCRIPTION OF THE DRAWINGS

The same reference numbers and reference designators are used in the drawings to designate the same or similar (functionally and/or structurally) features.

DETAILED DESCRIPTION

Some motor controllers include a velocity controller (e.g., a velocity proportional-integral (PI) controller) which may generate a velocity control signal based on a velocity error and a single pair of controller parameters (e.g., a prerational gain constant $K_p$ and an integral gain constant $K_i$ pair). A challenge with these velocity controllers is that the velocity controller uses the same controller parameters (e.g., a same $K_p$ and $K_i$) for each operating velocity of the motor, which may lead to suboptimal performance at some operating velocities. Another challenge with some velocity controllers is that determining the controller parameters based on the load on the motor requires the load to be linearized, which may lead to suboptimal performance for some non-linear loads.

Described herein are motor systems and methods that dynamically adapt operation of a velocity controller as motor velocity changes. Further described are motor systems and methods that determine velocity controller parameters in real time with minimal manual intervention.

Figure 1:
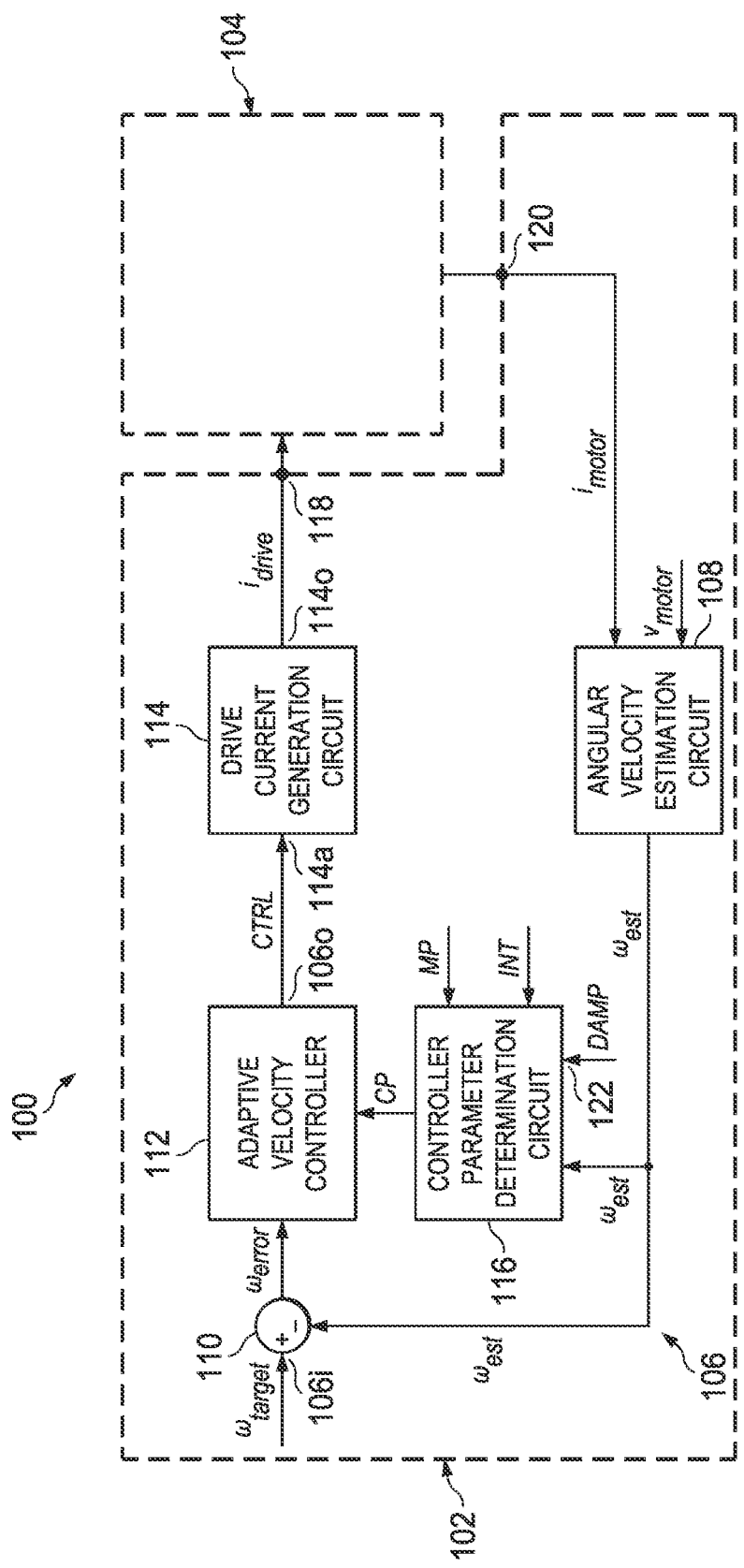
FIG. 1 is a block diagram of an example motor system which includes a motor and a motor controller.

FIG. 1 is a block diagram of an example motor system 100 which includes a motor 104 and a motor controller 102 in accordance with some embodiments.

The motor controller 102 is operable to control the motor 104. The motor controller 102 is coupled to the motor 104 via a motor drive terminal 118 and a motor feedback terminal 120. In some examples, the motor drive terminal 118 and the motor feedback terminal 120 may be the same terminal and each of terminals 118 and 120 may include multiple terminals (e.g. three terminals for each of terminals 118 and 120, if they are separate, to accommodate for a three-phase motor). In some examples, the motor 104 is a BLDC motor, the motor controller 102 is a BLDC motor controller, and the motor system 100 is a BLDC motor system.

The motor controller 102 includes drive current generation circuitry 114 (e.g., multiphase current generation circuitry) having a first input 114a and an output 114o. The output 114o is coupled to the motor drive terminal 118. The drive current generation circuitry 114 is configured to generate a drive current $i_{drive}$ (e.g., a multiphase drive current signal) and to provide the drive current $i_{drive}$, to the motor 104 to cause the motor 104 to rotate and to control the rotation of the motor 104.

The motor controller 102 further includes a velocity control path 106. The velocity control path 106 includes angular velocity estimation circuitry 108, a velocity comparator 110 (which may be implemented, for example, by an adder or a subtractor circuit), and an adaptive velocity controller 112. The velocity control path 106 has a target velocity input 106i and a velocity control path output 106o. A target angular velocity $\omega_{target}$ is provided at the target velocity input 106i.

The motor feedback terminal 120 is coupled to an input of the angular velocity estimation circuitry 108. The angular velocity estimation circuitry 108 is configured to determine an estimated angular velocity $\omega_{est}$ of a rotor of the motor 104 based on a back electromotive force of the motor 104. The angular velocity estimation circuitry 108 is configured to receive a motor current $i_{motor}$ from the motor feedback terminal 120 and to receive a motor voltage $v_{motor}$. In some examples, the motor current $i_{motor}$ is a measured motor current and the motor voltage $v_{motor}$ is a measured motor motor is motor is voltage (e.g., that are received from the motor feedback terminal 120). In some other examples, the motor voltage $v_{motor}$ is an estimated motor voltage that is estimated based on a DC voltage of the drive current generation circuitry 114. The angular velocity estimation circuitry 108 is configured to determine the back electromotive force of the motor based on the motor current $i_{motor}$ and the motor voltage $v_{motor}$.

The target velocity input 106i is coupled to a first input of the velocity comparator 110 and an output of the angular velocity estimation circuitry 108 is coupled to a second input of the velocity comparator 110. The velocity comparator 110 is configured to determine a velocity error $\omega_{error}$ based on a difference between the target angular velocity $\omega_{target}$ and the estimated angular velocity $\omega_{est}$.

The output of the velocity comparator 110 is coupled to a first input of the adaptive velocity controller 112 and an output of the adaptive velocity controller 112 is coupled to the velocity control path output 106o. The adaptive velocity controller 112 is configured to generate a velocity control signal CTRL based on the velocity error $\omega_{error}$ and a set of controller parameters CP.

In some examples, the velocity control path output 106o is coupled to the first input 114a of the drive current generation circuitry 114 to provide the velocity control signal CTRL to the drive current generation circuitry 114. The drive current generation circuitry 114 is configured to generate the drive current $i_{drive}$ based on the velocity control signal CTRL. The drive current generation circuitry 114 is configured to provide the drive current $i_{drive}$ from the output 114o to the motor 104 via the motor drive terminal 118.

To adaptively control the motor velocity, the motor controller 102 further includes controller parameter determination circuitry 116 coupled to the angular velocity estimation circuitry 108 and coupled to the adaptive velocity controller 112. In the illustrated example, the output of the angular velocity estimation circuitry 108 is coupled to a first input of the controller parameter determination circuitry 116 and an output of the controller parameter determination circuitry 116 is coupled to a second input of the adaptive velocity controller 112. The first input of the controller parameter determination circuitry 116 is configured to receive the estimated angular velocity $\omega_{est}$ from the angular velocity estimation circuitry 108.

A second input of the controller parameter determination circuitry 116 is configured to receive a plurality of mechanical parameters MP of the motor 104. A third input of the controller parameter determination circuitry 116 is configured to receive one or more values relating to the inertia INT of the motor 104. See, for example, FIGS. 6 and 7 and their corresponding descriptions for more details regarding the determination of the plurality of mechanical parameters MP and the inertia INT of the motor 104. The controller parameter determination circuitry 116 is configured to determine the set of controller parameters CP for the adaptive velocity controller 112 at a given time based on the estimated angular velocity $\omega_{est}$ at the given time, based on the plurality of mechanical parameters MP of the motor 104, and based on the inertia INT of the motor 104. Further, the adaptive velocity controller 112 is configured to generate the velocity control signal CTRL at the given time based on the set of controller parameters CP determined at the given time.

For example, the controller parameter determination circuitry 116 is configured to determine a first set of controller parameters CP at a first time based on: (i) the estimated angular velocity $\omega_{est}$ at the first time; (ii) the plurality of mechanical parameters MP; and (iii) the inertia INT. In turn, the adaptive velocity controller 112 is configured to generate the velocity control signal CTRL at the first time based on the first set of controller parameters CP. Further, the controller parameter determination circuitry 116 is configured to determine a second set of controller parameters CP at a second time based on: (i) the estimated angular velocity $\omega_{est}$ at the second time; (ii) the plurality of mechanical parameters MP; and (iii) the inertia INT. In turn, the adaptive velocity controller 112 is configured to generate the velocity control signal CTRL at the second time based on the second set of controller parameters CP. In some examples, the adaptive velocity controller 112 is a PI controller and the set of controller parameters CP includes a proportional gain constant and integral gain constant pair (e.g., a $K_p$ and $K_i$ pair).

By including the controller parameter determination circuitry 116 in the motor controller 102, a performance of the motor controller 102 and the motor 104 may be improved. For example, because the controller parameter determination circuitry 116 determines a gain constant pair (e.g., updates the gain constant pair) at each estimated angular velocity $\omega_{est}$, a performance of the motor controller 102 and hence a performance of the motor 104 may be substantially optimized at each operating velocity. Further, by determining the set of gain constant pairs based on the mechanical parameters MP of the motor 104, which may correspond to a non-linear system, a performance of the motor controller 102 may be improved for some loads exhibiting non-linear characteristics.

In place of the angular velocity estimation circuitry 108, some other motor systems may use one or more sensors (e.g., magnetic field sensors) to directly measure the angular velocity of a rotor. However, these sensors may add additional cost to the motor system and may be prone to failure. By using a sensor-less motor system as shown in the motor system 100 of FIG. 1, the motor system 100 of FIG. 1 may be less expensive and/or more reliable.

In some examples, the controller parameter determination circuitry 116 is further coupled to a damping factor input 122 and is configured to determine the set of controller parameters CP further based on a damping factor DAMP at the damping factor input 122. In some examples, the damping factor DAMP may be provided to the damping factor input 122 by a user, some other circuitry, or another system.

In some examples, the motor controller 102 may further include angular position estimation circuitry (e.g., 202 of FIG. 2) that is coupled to the motor feedback terminal 120 and to the drive current generation circuitry 114. The angular position estimation circuitry is configured to determine an estimated angular position of the rotor and to output the estimated angular position to the drive current generation circuitry 114. The drive current generation circuitry 114 is configured to generate the drive current $i_{drive}$ further based on the estimated angular position, as will be explained in more detail with regard to FIG. 2.

Figure 2:
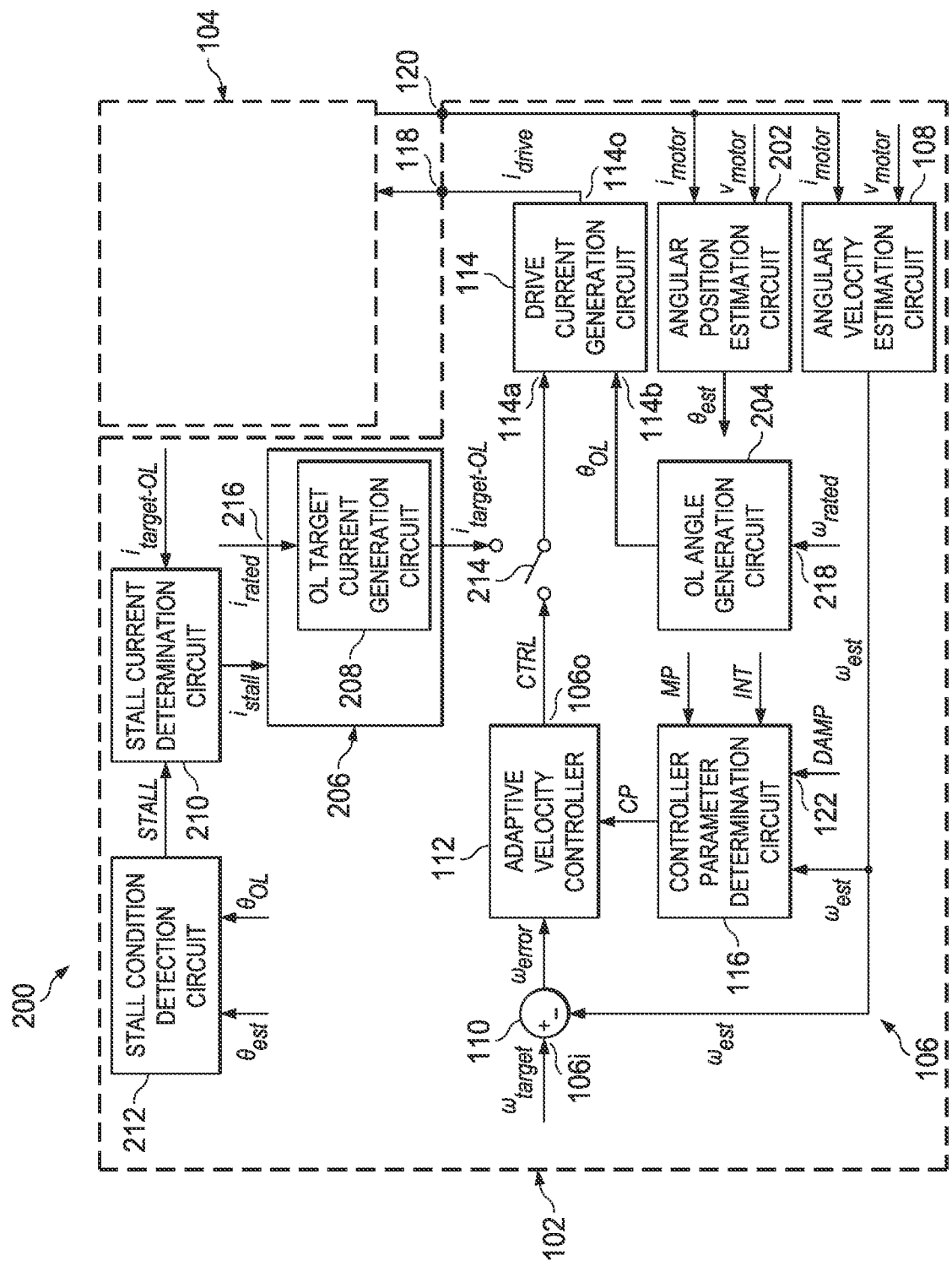
FIG. 2 is a block diagram of an example motor system that includes a motor and a motor controller which includes stall current determination circuitry.

FIG. 2 is a block diagram of an example motor system 200 that includes a motor 104 and a motor controller 102 which includes stall current determination circuitry 210.

The motor controller 102 of FIG. 2 includes features similar to the motor controller 102 of FIG. 1, and further includes angular position estimation circuitry 202, open loop angle generation circuitry 204, target current generation circuitry 206, stall current determination circuitry 210, stall condition detection circuitry 212, and a first switch 214.

The angular position estimation circuitry 202 is coupled to the motor feedback terminal 120. The angular position estimation circuitry 202 is configured to receive the motor current $i_{motor}$ from the motor feedback terminal 120 and to also receive the motor voltage $V_{motor}$. Similar to the angular velocity estimation circuitry 108, the angular position estimation circuitry 202 is configured to determine an estimated angular position $\theta_{est}$ of the rotor of the motor 104 based on the back electromotive force of the motor 104.

The open loop angle generation circuitry 204 is coupled to a second input 114b of the drive current generation circuitry 114. The open loop angle generation circuitry 204 is configured to generate an open loop commutation angle $\theta_{OL}$ and to provide the open loop commutation angle $\theta_{OL}$ to the drive current generation circuitry 114. The drive current generation circuitry 114 is configured to generate the drive current $i_{drive}$ based, in part, on the open loop commutation angle $\theta_{OL}$. Driving the motor 104 based on the open loop commutation angle $\theta_{OL}$ (e.g., generating the drive current $i_{drive}$ based on the open loop commutation angle $\theta_{OL}$) may be referred to as an open loop control mode of operation. The rate of change of the open loop commutation angle $\theta_{OL}$ corresponds to and/or sets the angular velocity at which the motor 104 is driven.

The target current generation circuitry 206 is selectively coupled to the first input 114a of the drive current generation circuitry 114 via the first switch 214. The target current generation circuitry 206 comprises open loop target current generation circuitry 208 that is configured to generate an open loop target current $i_{target-OL}$ and to provide the open loop target current $i_{target-OL}$ to the drive current generation circuitry 114 via the first switch 214.

The first switch is coupled to the drive current generation circuitry 114, to the velocity control path output 106o, and to the target current generation circuitry 206. The first switch 214 is configured to selectively couple either the velocity control path output 106o or the open loop target current generation circuitry 208 to the first input 114a of the drive current generation circuitry 114. Accordingly, the first switch 214 is configured to selectively provide either the velocity control signal CTRL or the open loop target current $i_{target-OL}$ the first input 114a of the drive current generation circuitry 114. Thus, the drive current generation circuitry 114 is configured to generate the drive current $i_{drive}$ based, in part, on either the velocity control signal CTRL or the open loop target current $i_{target-OL}$. In some examples, the velocity control signal CTRL is a current signal.

A first input of the stall condition detection circuitry 212 is coupled to the angular position estimation circuitry 202. A second input of the stall condition detection circuitry 212 is coupled to the open loop angle generation circuitry 204. An output of the stall condition detection circuitry 212 is coupled to the stall current determination circuitry 210. The stall condition detection circuitry 212 is configured to monitor for a stall condition based on the open loop commutation angle $\theta_{OL}$ and based on the estimated angular position $\theta_{est}$. For example, the stall condition detection circuitry 212 is configured to determine an offset angle (e.g., $\theta_{off}$ of FIGS. 3 and 4A-4C) between the open loop commutation angle $\theta_{OL}$ and the estimated angular position $\theta_{est}$, and to monitor for the stall condition based on the offset angle. In some examples, the stall condition detection circuitry 212 is configured to provide a stall signal STALL to the stall current determination circuitry 210 in response to detecting the stall condition.

A first input of the stall current determination circuitry 210 is coupled to the output of the stall condition detection circuitry 212. A second input of the stall current determination circuitry 210 is coupled to the target current generation circuitry 206. An output of the stall current determination circuitry 210 is coupled to the target current generation circuitry 206. The stall current determination circuitry 210 is configured to receive the stall signal STALL from the stall condition detection circuitry 212, to receive the open loop target current $i_{target-OL}$ from the open loop target current generation circuitry 208, and to output a stall current $i_{stall}$ to the target current generation circuitry 206 based on the open loop target current $i_{target-OL}$ when the stall condition is detected (e.g., when the stall signal STALL is received).

The motor controller 102 is configured to determine the stall current $i_{stall}$ of the motor 104 at a predetermined velocity (e.g., a predetermined rate of change of the open loop commutation angle $\theta_{OL}$). For example, the first switch 214 is configured to selectively couple the target current generation circuitry 206 to the first input 114a of the drive current generation circuitry 114. The open loop target current generation circuitry 208 is configured to provide an open loop target current $i_{target-OL}$ to the first input 114a and the open loop angle generation circuitry 204 is configured to provide an open loop commutation angle $\theta_{OL}$ to the second input 114b of the drive current generation circuitry 114 to drive the motor 104 at the predetermined velocity. The angular position estimation circuitry 202 is configured to determine the estimated angular position $\theta_{est}$ of the rotor of the motor 104.

While the stall condition detection circuitry 212 is monitoring for a stall condition based on the offset angle, the open loop target current generation circuitry 208 is configured to decrease (e.g., incrementally or gradually) the open loop target current $i_{target-OL}$ at least until the stall condition is detected. The stall current determination circuitry 210 is configured to determine the stall current $i_{stall}$ corresponding to the predetermined velocity based on the open loop target current $i_{target-OL}$ when the stall condition is detected. In some examples, the stall condition is detected when the offset angle reaches approximately 90 degrees because when the offset angle reaches 90 degrees (e.g., when the open loop commutation angle $\theta_{OL}$ leads the estimated angular position of the rotor $\theta_{est}$ by 90 degrees), the torque generated by the motor is maximized, so lowering the open loop target current $i_{target-OL}$ any further could cause the motor 104 to stall. See FIGS. 4A, 4B, 4C, and 5 and their descriptions below for more details.

In some examples, by determining the stall current $i_{stall}$ corresponding to the predetermined velocity, a reliable entry point into a closed loop control mode of operation may be established. See FIGS. 6 and 7 and their descriptions below for more details.

In some examples, the open loop target current generation circuitry 208 is configured to receive a rated current $i_{rated}$ of the motor 104 (e.g., a value representing a maximum current rating of the motor 104 and received at a rated current input 216) and the initial value of the open loop target current $i_{target-OL}$ that is provided to the drive current generation circuitry 114 (e.g., before the decreasing of the open loop target current $i_{target-OL}$) is selected based on the rated current $i_{rated}$ of the motor 104. For example, the initial value of the open loop target current $i_{target-OL}$ may be selected to be between 80% of the rated current and 30% of the rated current, or some other suitable value. Similarly, the open loop angle generation circuitry 204 is configured to receive a rated velocity $\omega_{rated}$ of the motor 104 (e.g., a value representing a maximum velocity rating of the motor 104 and received at a rated velocity input 218) and the predetermined velocity (e.g., the predetermined rate of change of the open loop commutation angle $\theta_{OL}$) is selected based on the rated velocity $\omega_{rated}$. For example, the predetermined velocity may be selected to be between 50% of the rated velocity and 20% of the rated velocity, or some other suitable value.

In some examples, the initial value of the open loop target current $i_{target-OL}$ is selected to be a first fraction of the rated current $i_{rated}$, the predetermined velocity is selected to be a second fraction of the rated velocity $\omega_{rated}$, and the first fraction is greater than the second fraction. In other words, the initial value of the open loop target current $i_{target-OL}$ is selected to be a percentage of the rated current $i_{rated}$, the predetermined velocity is selected to be a percentage of the rated velocity $\omega_{rated}$, and the selected percentage of the rated current is greater than the selected percentage of the rated velocity. In some examples, the rated current $i_{rated}$ and the rated velocity $\omega_{rated}$ of the motor 104 are input by a user, some other circuitry, or another system.

Figure 3:
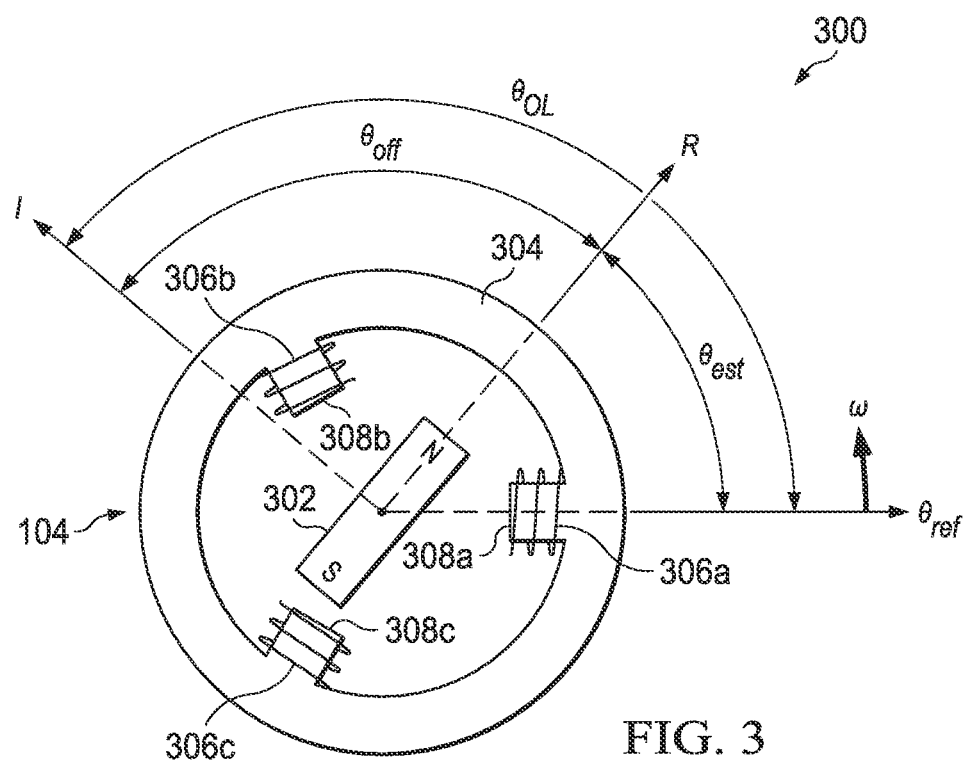
FIG. 3 is a diagram of an example motor comprising a rotor and a stator.

FIG. 3 is a diagram 300 of an example motor 104 comprising a rotor 302 and a stator 304.

The rotor 302 includes a permanent magnet having a north pole and a south pole. The rotor 302 is configured to rotate about an axis (in this example, the axis is into the page and at the center of rotor 302). At a given point in time, the north pole of the rotor forms a first angle with respect to a reference angle $\theta_{ref}$. This first angle is the angular position of the rotor that is estimated by the angular position estimation circuitry 202 of FIG. 2. In other words, the first angle is the estimated angular position $\theta_{est}$ of the rotor 302. The estimated angular position $\theta_{est}$ may change over time depending on the angular velocity of the rotor 302.

The stator 304 includes a plurality of windings 306a, 306b, and 306c that surround a plurality of cores 308a, 308b, and 308c, respectively. The plurality of windings 306a-306c may be coupled to a motor controller (e.g., 102 of FIGS. 1 and 2) via a motor drive terminal (e.g., 118 of FIGS. 1 and 2). As noted above, terminal 118 may include three separate terminals with each terminal coupled different windings (such as windings 306a-306c). In addition, if separate from terminal 118, terminal 120 may also include three separate terminals with each terminal coupled to a different winding (such as windings 306a-306c). Current(s) may be passed through the windings 306a-306c in a sequential manner to excite the motor 104 to cause the rotor 302 to rotate. When current passes through the windings 306a-306c, a magnetic field is generated that surrounds the windings. The magnetic fields generated around each of the windings together have a net direction of magnetization. At a given point in time, the net direction of magnetization forms a second angle with respect to the reference angle $\theta_{ref}$. In open loop control mode, this second angle is the open loop commutation angle $\theta_{OL}$ that is generated by the open loop angle generation circuitry 204 of FIG. 2.

At a given point in time, an offset angle $\theta_{off}$ exists between the open loop commutation angle $\theta_{OL}$ and the estimated angular position $\theta_{est}$ of the rotor 302. When operating in open loop control mode, the offset angle $\theta_{off}$ is dependent on the magnitude of the open loop target current $i_{target-OL}$ and a load torque of the motor 104, as shown in equation 1 below:

$$\tau_g = 1.5 * p * i * \sin(\theta_{off}) * [\psi_m + (L_d - L_q) * i * \cos(\theta_{off})] \qquad \text{EQ. 1}$$

where $\tau_g$ is the torque generated by the motor 104, p is the number of pairs of poles in the rotor, i is the open loop target current $i_{target-OL}$ when in open loop control mode, $\theta_{off}$ the offset angle, $\psi_m$ is the torque constant of the motor, $L_d$ is the motor inductance corresponding to a d-axis (e.g., a direct axis) of the rotor, and $L_q$ is the motor inductance corresponding to a q-axis (e.g., a quadrature axis) of the rotor.

At a fixed velocity (e.g., the predetermined velocity), the torque generated $\tau_g$ by the motor 104 is constant. Thus, decreasing the open loop target current $i_{target-OL}$ while maintaining the predetermined velocity causes the offset angle $\theta_{off}$ to increase, as illustrated in FIGS. 4A through 4C, where the length of the vector I corresponds to the magnitude of the open loop target current $i_{target-OL}$, and where the length of the vector I is decreased from FIGS. 4A to 4C.

Figure 4A:
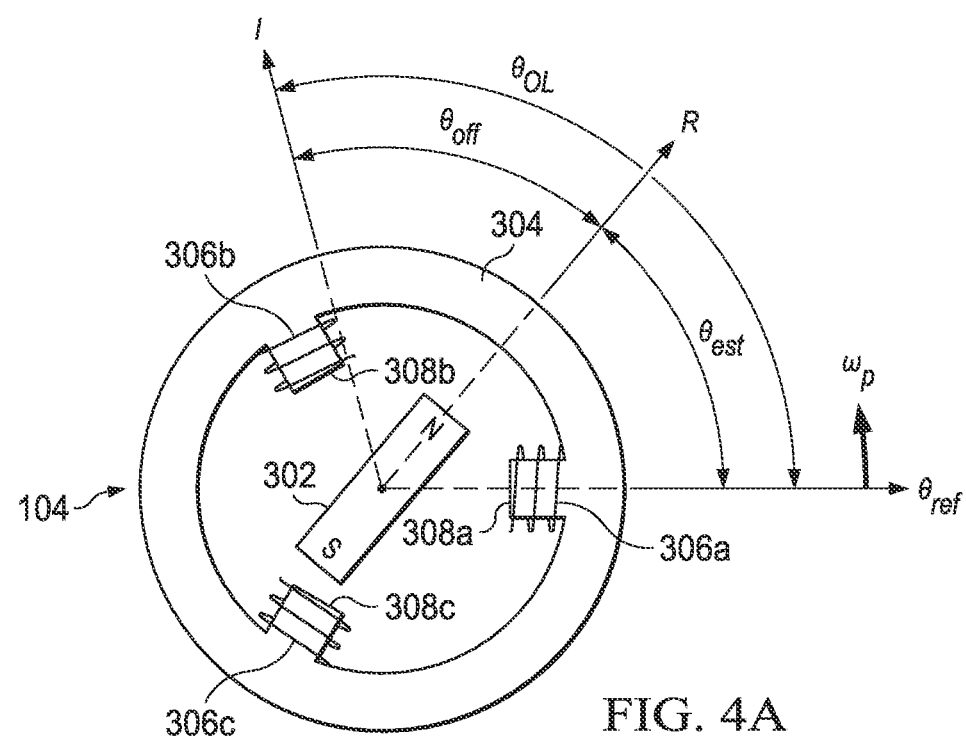
FIGS. 4A, 4B, and 4C are diagrams of an example motor during an example process for determining a stall current.
Figure 4B:
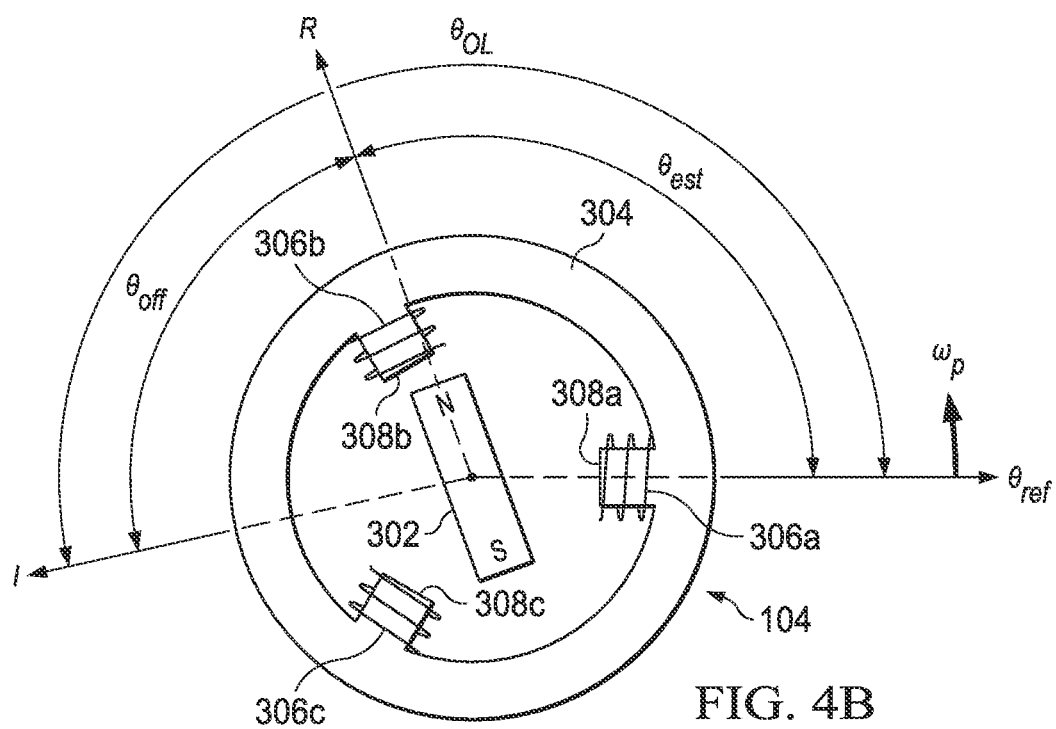
Figure 4C:
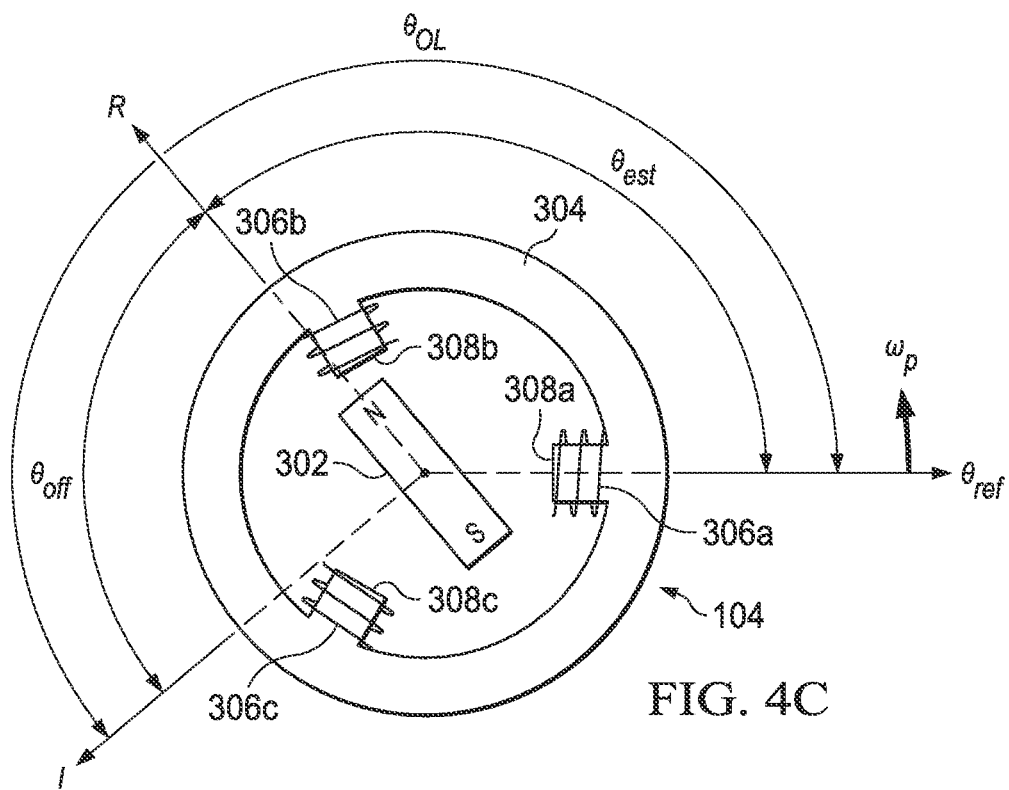

For example, in FIGS. 4A, 4B, and 4C, the rotor 302 is being driven to rotate at the predetermined velocity $\omega_p$. In FIG. 4A, the vector I has a first length (e.g., the open loop target current $i_{target-OL}$ has a first magnitude) and the offset angle $\theta_{off}$ has a first value.

In FIG. 4B, the magnitude of the open loop target current $i_{target-OL}$ is decreased to a second magnitude less than the first magnitude (e.g., as shown by the vector I having a second length less than the first length). As a result, the offset angle $\theta_{off}$ increases to a second value greater than the first value so the generated torque remains constant.

In FIG. 4C, the magnitude of the open loop target current $i_{target-OL}$ is decreased again to a third magnitude less than the second magnitude (e.g., as shown by the vector I having a third length less than the second length). As a result, the offset angle $\theta_{off}$ increases again to a third value greater than the second value so the generated torque remains constant. In the example illustrated in FIGS. 4A to 4C, the offset angle $\theta_{off}$ reaches 90 degrees at FIG. 4C, when the open loop target current is decreased to the third magnitude. Thus, in this example, the third magnitude is equal to the stall current magnitude for the motor 104 at the predetermined velocity $\omega_p$.

Once the offset angle $\theta_{off}$ reaches 90 degrees (e.g., as illustrated in FIG. 4C), the $\sin(\theta_{off})$ term from equation 1 is maximized, and hence any decrease in the open loop target current $i_{target-OL}$ will cause the generated torque $\tau_g$ to decrease. As a result, the generated torque $\tau_g$ may drop below the load torque and hence the motor 104 may stall. Thus, by monitoring the offset angle $\theta_{off}$ while decreasing the open loop target current $i_{target-OL}$, and by recording the value of the open loop target current $i_{target-OL}$ when the offset angle $\theta_{off}$ reaches 90 degrees, the minimum current required to drive the motor at the predetermined velocity can be determined. This minimum current is the stall current $i_{stall}$. As discussed above, by determining the stall current $i_{stall}$ for a predetermined velocity, a reliable entry point into a closed loop control mode of operation can be established.

Figure 5:
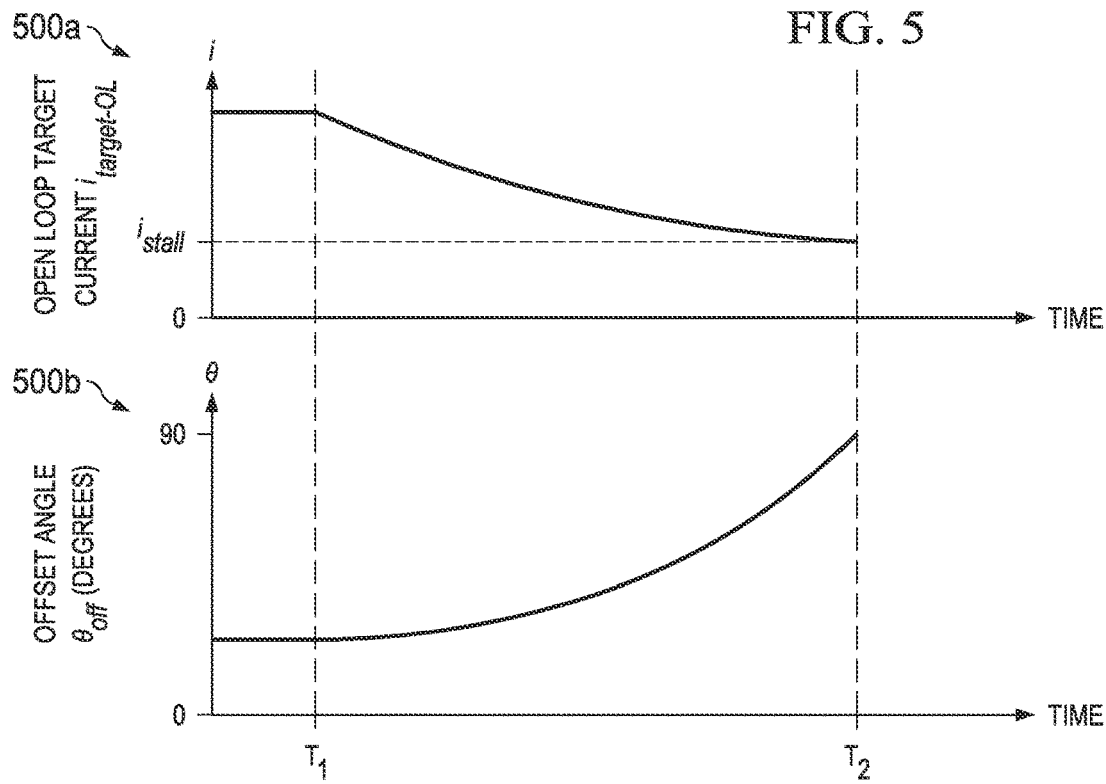
FIG. 5 is a graph of an open loop target current and an offset angle over time during an example process for determining a stall current.

FIG. 5 is a graph of the open loop target current $i_{target-OL}$ over time 500a and the offset angle $\theta_{off}$ over time 500b during an example process for determining a stall current.

As shown in FIG. 5, the open loop target current $i_{target-OL}$ is gradually (e.g., incrementally) reduced over time (e.g., from a first time T1 to a second time T2) at least until the offset angle $\theta_{off}$ reaches 90 degrees. The value of the open loop target current $i_{target-OL}$ may be decreased in an exponential fashion, as shown in FIG. 5, in a linear fashion, or in some other suitable manner. As discussed previously, reducing the open loop target current $i_{target-OL}$ causes the offset angle $\theta_{off}$ to increase. The value of the open loop target current $i_{target-OL}$ when the offset angle $\theta_{off}$ reaches 90 degrees (e.g., at the second time T2) is the stall current $i_{stall}$ for that velocity. Further, as discussed above, once the offset angle $\theta_{off}$ reaches 90 degrees, the generated torque is maximized for a given velocity. Any further reduction in the open loop target current $i_{target-OL}$ may cause the generated torque to fall below a load torque and hence the motor 104 may stall.

Figure 6:
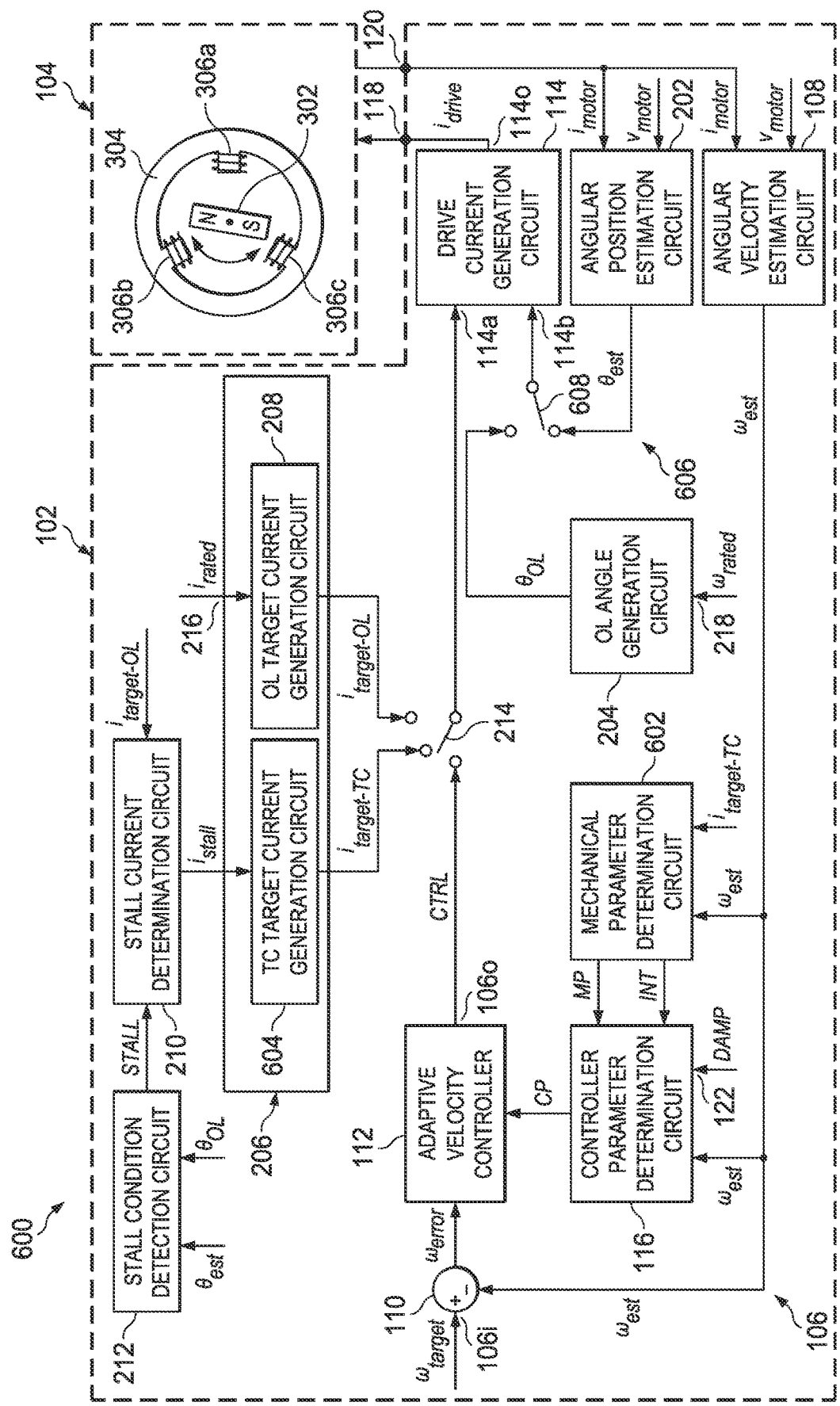
FIG. 6 is a block diagram of an example motor system that includes a motor and a motor controller which includes mechanical parameter determination circuitry.

FIG. 6 is a block diagram of an example motor system 600 that includes a motor 104 and a motor controller 102 which includes mechanical parameter determination circuitry 602.

The motor controller 102 of FIG. 6 includes features similar to the motor controller 102 of FIG. 2, and further includes the mechanical parameter determination circuitry 602, an angular position control path 606, and a second switch 608. In addition, the target current generation circuitry 206 further includes torque control target current generation circuitry 604.

The mechanical parameter determination circuitry 602 is coupled to the angular velocity estimation circuitry 108, to the torque control target current generation circuitry 604, and to the controller parameter determination circuitry 116. In the illustrated example, the output of the angular velocity estimation circuitry 108 is coupled to a first input of the mechanical parameter determination circuitry 602, an output of the torque control target current generation circuitry 604 is coupled to a second input of the mechanical parameter determination circuitry 602, and first and second outputs of the mechanical parameter determination circuitry 602 are coupled to the second and third inputs of the controller parameter determination circuitry 116. The mechanical parameter determination circuitry 602 is configured to determine the plurality of mechanical parameters MP of the motor 104 based on a set of torque control target current values and a set of corresponding estimated angular velocities $\omega_{est}$.

The angular position control path 606 includes the angular position estimation circuitry 202 and the open loop angle generation circuitry 204. Outputs of the angular position estimation circuitry 202 and the open loop angle generation circuitry 204 are selectively coupled to the second input 114b of the drive current generation circuitry 114 by the second switch 608.

The second switch 608 is coupled to the drive current generation circuitry 114, to the angular position estimation circuitry 202, and to the open loop angle generation circuitry 204. The second switch 608 is configured to selectively couple either the angular position estimation circuitry 202 or the open loop angle generation circuitry 204 to the second input 114b of the drive current generation circuitry 114. As previously discussed, when generating drive current based on the open loop commutation angle $\theta_{OL}$ (e.g., when the open loop angle generation circuitry 204 is coupled, by way of the second switch 608, to the drive current generation circuitry 114), the motor controller 102 is operating in the open loop control mode. Alternatively, the second switch 608 couples the angular position estimation circuitry 202 to the drive current generation circuitry 114 to operate in a closed loop control mode. When generating the drive current $i_{drive}$ based on the estimated angular position $\theta_{est}$ (e.g., when the angular position estimation circuitry 202 is coupled to the drive current generation circuitry 114), the motor controller 102 is operating in the closed loop control mode.

The torque control target current generation circuitry 604 is coupled to the stall current determination circuitry 210 and is selectively coupled to the first input 114a of the drive current generation circuitry 114 via the first switch 214. The torque control target current generation circuitry 604 is configured to receive the stall current $i_{stall}$ from the stall current determination circuitry 210 and to provide a torque control target current $i_{target-OL}$ to the drive current generation circuitry 114 via the first switch 214 when operating in a closed loop control mode.

The first switch 214 is configured to selectively couple either the velocity control path output 106o, the open loop target current generation circuitry 208, or the torque control target current generation circuitry 604 to the first input 114a of the drive current generation circuitry 114. When operating in open loop control mode (e.g., when the second switch 608 couples the open loop angle generation circuitry 204 to the drive current generation circuitry 114), the first switch 214 couples the open loop target current generation circuitry 208 to the drive current generation circuitry 114. When operating in closed loop control mode (e.g., when the second switch 608 couples the angular position estimation circuitry 202 to the drive current generation circuitry 114), the first switch 214 couples either the velocity control path output 106o or the torque control target current generation circuitry 604 to the drive current generation circuitry 114. In particular, to operate in a closed loop velocity control mode, the first switch 214 couples the velocity control path output 106o to the drive current generation circuitry 114. Further, to operate in closed loop torque control mode, the first switch 214 couples the torque control target current generation circuitry 604 to the drive current generation circuitry 114.

In some examples, determining the plurality of mechanical parameters MP comprises a number of processes that are performed while the motor controller 102 is operating in the closed loop torque control mode. First, the first switch 214 is configured to couple the torque control target current generation circuitry 604 to the first input 114a of the drive current generation circuitry 114 and the second switch 608 is configured to couple the open loop angle generation circuitry 204 to the second input 114b of the drive current generation circuitry 114. Then the torque control target current generation circuitry 604 is configured to provide a torque control target current $i_{target-TC}$ the first input 114a of the drive current generation circuitry 114 via the first switch 214. The open loop angle generation circuitry 204 is configured to provide an open loop commutation angle $\theta_{OL}$ to the second input 114b of the drive current generation circuitry 114 via the second switch 608. The initial value of the torque control target current $i_{target-TC}$ is set to the determined stall current $i_{stall}$ for the predetermined velocity $\omega_p$, and the initial rate of change of the open loop commutation angle $\theta_{OL}$ corresponds to the predetermined velocity $\omega_p$, as shown in FIG. 7.

Next, the second switch 608 is configured to switch from the open loop angle generation circuitry 204 to the angular position estimation circuitry 202 and the angular position estimation circuitry 202 is configured to provide the estimated angular position $\theta_{est}$ to the second input 114b of the drive current generation circuitry 114 (e.g., to switch to closed loop torque control mode).

Figure 7:
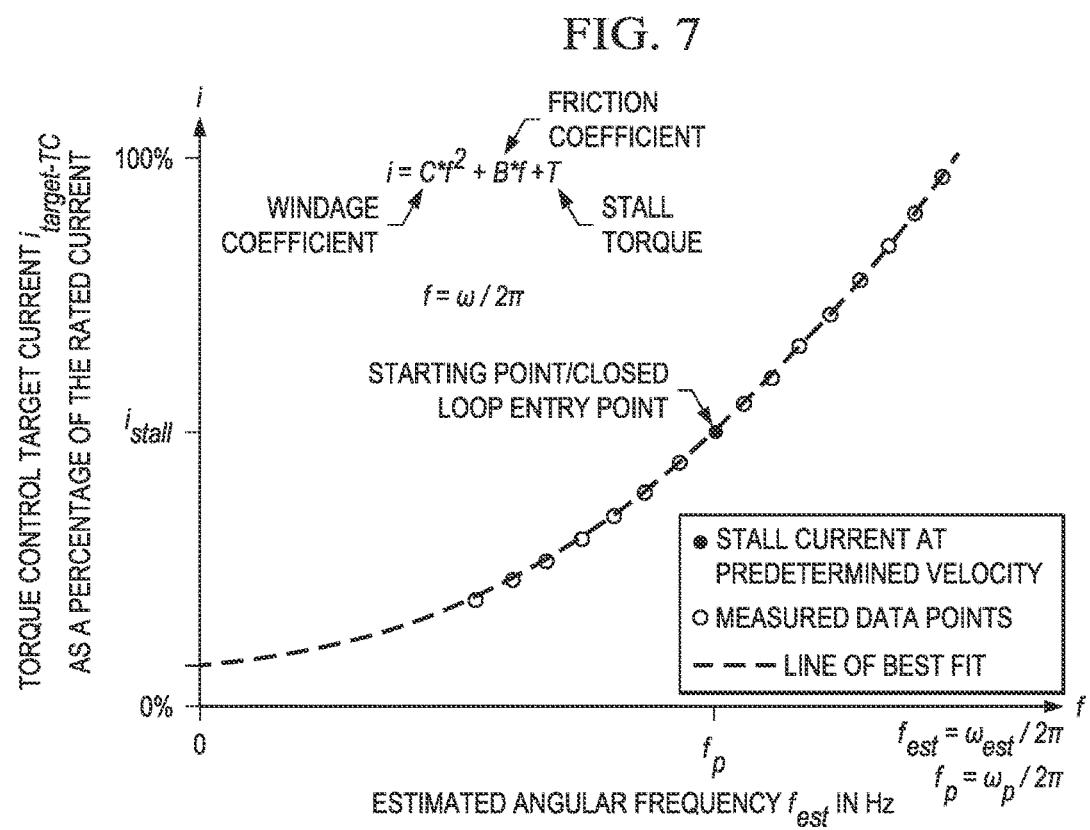
FIG. 7 is a graph of a torque control target current of a motor controller versus an estimated angular frequency of a motor during an example process for determining mechanical parameters of a motor.

Next, the torque control target current generation circuitry 604 is configured to incrementally adjust the torque control target current $i_{target-TC}$ through a set of current values and the angular position estimation circuitry 202 is configured to determine a set of corresponding estimated angular velocities $\omega_{est}$, where each corresponding estimated angular velocity of the set corresponds to a current value of the set of current values, as shown in FIG. 7.

The mechanical parameter determination circuitry 602 is then configured to determine the mechanical parameters MP based on the set of current values and the set of corresponding estimated angular velocities. The mechanical parameters MP include a windage coefficient, a friction coefficient, and a stall torque of the motor 104. In particular, the mechanical parameter determination circuitry 602 is configured to determine a function (e.g., EQ. 2) that relates the set of current values to the set of corresponding estimated angular velocities. This may be achieved by plotting the set of current values versus the set of corresponding estimated angular velocities and by determining a line of best fit for the measured data points in the plot. In some examples, the line of best fit is a second order polynomial. For example, the line of best fit is represented using the following equation:

$$i = C*f^2 + B*f + T \qquad \text{EQ. 2}$$

where i is the torque control target current expressed as a unitless percentage of the rated current, f is the estimated angular velocity determined by the angular velocity estimation circuitry 108 in hertz (i.e., the estimated angular frequency), C is the windage coefficient of the motor 104, B is the friction coefficient of the motor 104, and T is the stall torque of the motor 104 (e.g., as a fraction of a maximum rated torque of the motor 104). In this manner, the mechanical parameter determination circuitry 602 can determine the mechanical parameters MP.

In addition, the mechanical parameter determination circuitry 602 is configured to determine an inertia INT of the motor 104 as follows. First, while the first switch 214 is coupling the torque control target current generation circuitry 604 to the drive current generation circuitry 114 and while the motor controller 102 is driving the motor 104 at a first velocity, the torque control target current generation circuitry 604 is configured to remove the torque control target current $i_{target-TC}$ (e.g., the torque control target current $i_{target-TC}$ is set to zero) so the motor 104 coasts. The mechanical parameter determination circuitry 602 is then configured to measure the amount of time that it takes for the estimated angular velocity $\omega_{est}$ to decrease by a predetermined percentage (e.g., 50 percent or some other suitable percentage) while coasting. The mechanical parameter determination circuitry 602 then determines the inertia INT of the motor 104 based on the amount of time, the predetermined percentage, and the mechanical parameters MP. For example, the inertia INT can be determined using equations 3 through 6:

$$Jf' = i - (Cf^2 + Bf + T) \qquad \text{EQ. 3}$$

where J is the inertia INT, f is frequency (e.g., $f = \omega/2\pi$), and i is the torque control target current $i_{target-TC}$. When coasting, i is equal to zero (e.g., $i_{target-TC}$ is set to zero, as previously discussed). Then, by integrating equation 3 where i is equal to zero, equations 4 through 6 can be derived and used to determine the inertia INT. In particular, equation 4 can be used when $4*C*T > B^2$ and equation 5 can be used when $4*C*T < B^2$.

$$J = \frac{-(t_2 - t_1)*C*\Delta}{\tan^{-1}\left(\frac{\omega_2 + \frac{B}{2*C}}{\Delta}\right) - \tan^{-1}\left(\frac{\omega_1 + \frac{B}{2*C}}{\Delta}\right)} \qquad \text{EQ. 4}$$

$$J = \frac{(t_2 - t_1)*2*C*\Delta}{\log\left[\frac{\left(\omega_2 + \frac{B}{2*C} + \Delta\right)\left(\omega_1 + \frac{B}{2*C} - \Delta\right)}{\left(\omega_1 + \frac{B}{2*C} + \Delta\right)\left(\omega_2 + \frac{B}{2*C} - \Delta\right)}\right]} \qquad \text{EQ. 5}$$

$$\Delta = \frac{\sqrt{B^2 - 4*T*C}}{2*C} \qquad \text{EQ. 6}$$

In equations 4 and 5, $t_1$ is a first time, $\omega_1$ is the estimated angular velocity at the first time, $t_2$ is a second time, $\omega_2$ is the estimated angular velocity at the second time, and $\Delta$ is defined in equation 6.

Figure 8:
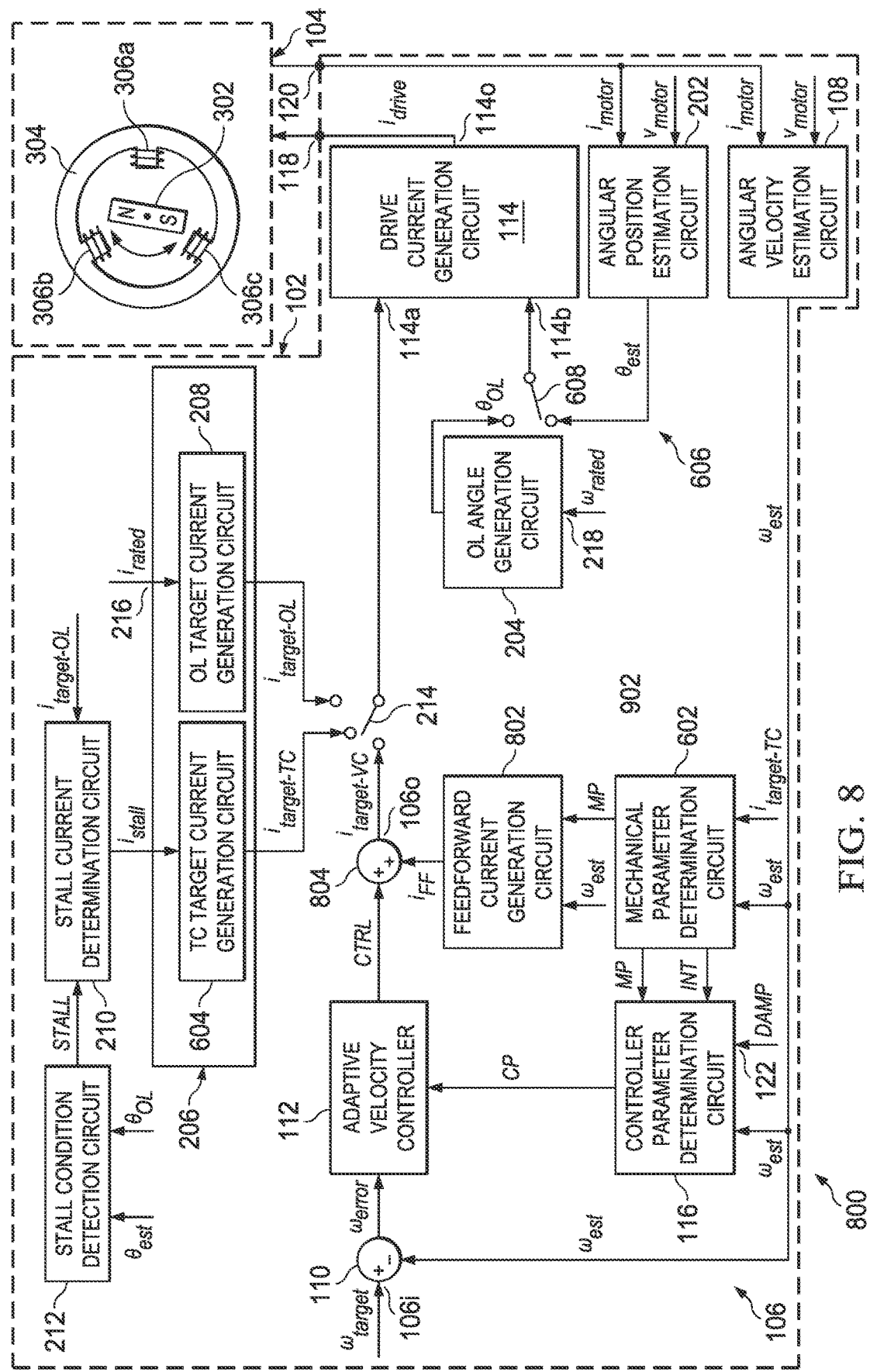
FIG. 8 is a block diagram of an example motor system that includes a motor and a motor controller which includes feedforward current generation circuitry.

FIG. 8 is a block diagram of an example motor system 800 that includes a motor 104 and a motor controller 102 which includes feedforward current generation circuitry 802.

The motor controller 102 of FIG. 8 includes features similar to the motor controller 102 of FIG. 6, and further includes the feedforward current generation circuitry 802 and a feedforward current adder 804. The feedforward current generation circuitry 802 is coupled to the angular velocity estimation circuitry 108, to the mechanical parameter determination circuitry 602, and to the feedforward current adder 804. The feedforward current adder 804 is coupled to the adaptive velocity controller 112, to the feedforward current generation circuitry 802, and to the first switch 214 (e.g., via the velocity control path output 106o). The feedforward current adder 804 is selectively coupled to the first input 114a of the drive current generation circuitry 114 via the first switch 214.

The output of the angular velocity estimation circuitry 108 is coupled to a first input of the feedforward current generation circuitry 802, an output of the mechanical parameter determination circuitry 602 is coupled to a second input of the feedforward current generation circuitry 802, and an output of the feedforward current generation circuitry 802 is coupled to the feedforward current adder 804. The output of the adaptive velocity controller 112 is coupled to a first input of the feedforward current adder 804, the output of the feedforward current generation circuitry 802 is coupled to a second input of the feedforward current adder 804, and an output of the feedforward current adder 804 is coupled to the first switch 214.

The feedforward current generation circuitry 802 is configured to generate a feedforward current $i_{FF}$ based on the estimated angular velocity $\omega_{est}$ and the plurality of mechanical parameters MP. The feedforward current adder 804 is configured to add the feedforward current $i_{FF}$ to the velocity control signal CTRL. In some examples, the velocity control signal is a current signal (e.g., a velocity control current signal). Further, the drive current generation circuitry 114 is configured to generate the driving current $i_{drive}$ based on the sum of the feedforward current $i_{FF}$ and the velocity control signal CTRL (e.g., when operating in the closed loop velocity control mode). The feedforward current $i_{FF}$ can be determined at a point in time based on the estimated angular velocity $\omega_{est}$ at that point in time using the following equation 7:

$$i_{FF}(f) = C*f^2 + B*f + T \quad \text{EQ. 7}$$

where f is frequency (e.g., in hertz) and $$f = \frac{\omega_{est}}{2\pi}.$$

With the feedforward current generation circuitry 802 and the feedforward current adder 804 included in the motor system 800, the open loop transfer function for the motor system 800 can be written in the s domain (e.g., the Laplace transform domain) as shown in equation 8 below:

$$OLTF = \frac{\omega_{est}(s)}{\omega_{error}(s)} = G(s) = \frac{s*K_p + K_i}{s} \times \frac{1}{J*s + (B + 2*f*C)} \times \frac{1}{1 + \frac{10*s}{\omega}} \quad \text{EQ. 8}$$

where $\omega$ is the estimated angular velocity, f is the frequency and $$f = \frac{\omega}{2\pi},$$

where $k_p$ is the proportional gain constant, and $K_i$ is the integral gain constant. G(s) can then be rewritten as shown in equation 9:

$$G(s) = \frac{G_{PI}}{s} \times \frac{1}{1 + \frac{10*s}{\omega}} \quad \text{EQ. 9}$$

where $$G_{PI} = \frac{s*K_p + K_i}{J*s + (B + 2*f*C)}.$$

Then, $K_p$ and $K_i$ can be written as shown in equations 10 and 11 below:

$$K_p = G_{PI}*J \quad \text{EQ. 10}$$

$$K_i = G_{PI}*(B + 2*f*C) \quad \text{EQ. 11}$$

Next, the closed loop transform function for the system can be written in the s domain as shown in equation 12 below:

$$CLTF = \frac{G(s)}{1 + G(s)} = \frac{G_{PI}}{G_{PI} + s + \frac{10*s^2}{\omega}} = \frac{\frac{G_{PI}*\omega}{10}}{s^2 + \frac{\omega*s}{10} + \frac{G_{PI}*\omega}{10}} \quad \text{EQ. 12}$$

From equation 12, equations 13 and 14 can be derived, where $\omega_n$ is the natural frequency and $\zeta$ is the damping factor DAMP. Then, using equations 13 and 14, equation 15 can be derived and used with equations 10 and 11 to solve for $K_p$ and $K_i$.

$$\omega_n^2 = \frac{G_{PI}*\omega}{10} \quad \text{EQ. 13}$$

$$2*\zeta*\omega_n = \frac{\omega}{10} \quad \text{EQ. 14}$$

$$G_{PI} = \frac{\omega}{40*\zeta^2} \quad \text{EQ. 15}$$

Figure 9:
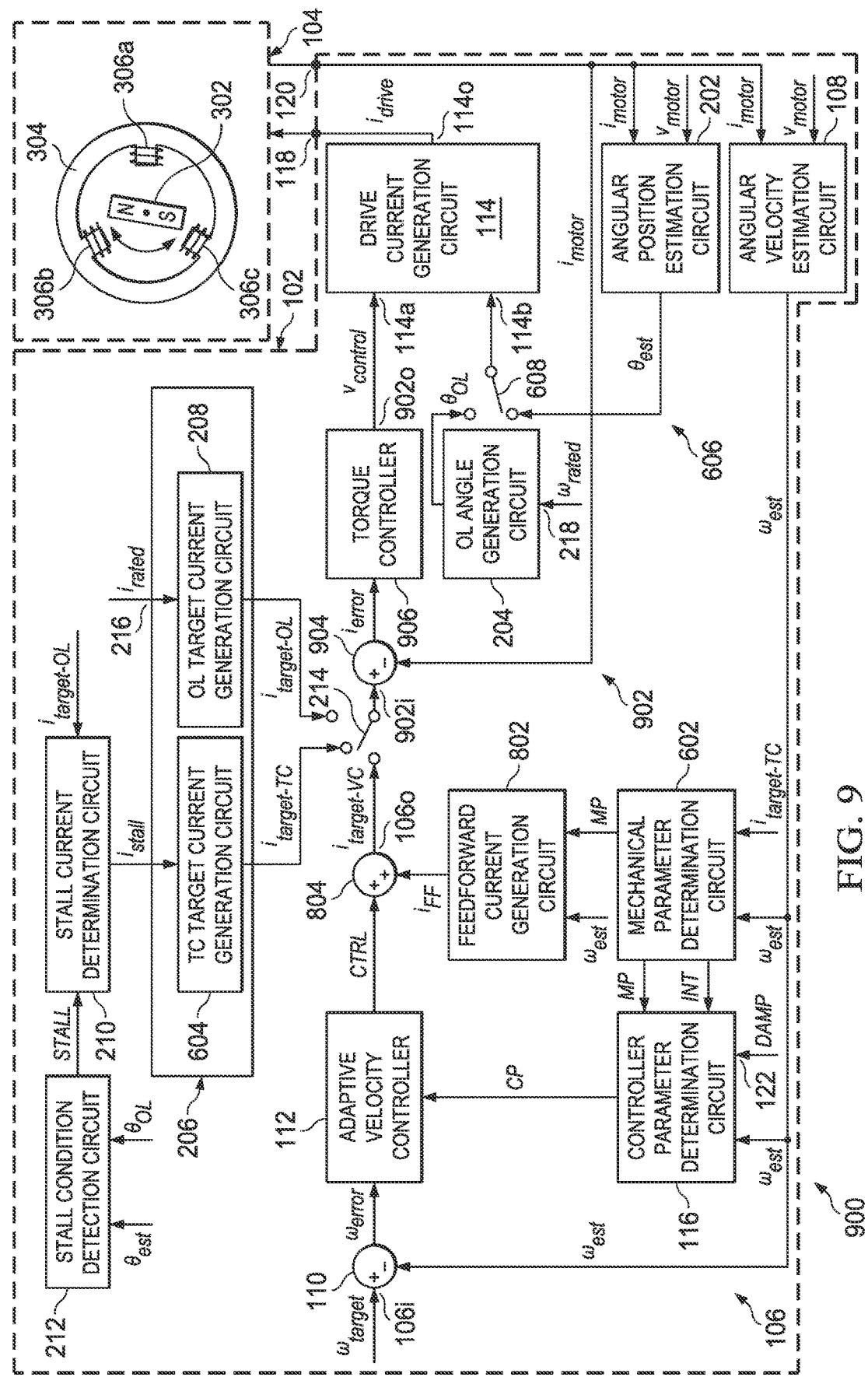
FIG. 9 is a block diagram of an example motor system that includes a motor and a motor controller which includes a torque controller.

FIG. 9 is a block diagram of an example motor system 900 that includes a motor 104 and a motor controller 102 which includes a torque controller 906.

The motor controller 102 of FIG. 9 includes features similar to the motor controller 102 of FIG. 8, and further includes a torque control path 902. The torque control path 902 is coupled between the velocity control path output 106o and the first input 114a of the drive current generation circuitry 114. The torque control path 902 includes a torque control path input 902i, a torque control path output 902o, a current comparator 904, and the torque controller 906. The torque control path input 902i is selectively coupled to the velocity control path output 106o via the first switch 214. The torque control path output 902o is coupled to the first input 114a of the drive current generation circuitry 114. The current comparator 904 is coupled to the torque control path input 902i and to the motor feedback terminal 120. A first input of the current comparator 904 is coupled to the first switch 214 and a second input of the current comparator is coupled to the motor feedback terminal 120. The torque controller 906 is coupled between the current comparator 904 and the torque control path output 902o. An input of the torque controller 906 is coupled to an output of the current comparator 904 and an output of the torque controller 906 is coupled to the first input 114a of the drive current generation circuitry 114.

The current comparator 904 is configured to receive the motor current $i_{motor}$ from the motor feedback terminal 120 and to receive one of the velocity control target current $i_{target-VC}$, the torque control target current $i_{target-TC}$, or the open loop target current $i_{target-OL}$ (e.g., depending on the position of the first switch 214, which depends on the mode of operation). The current comparator 904 is configured to generate a current error $i_{error}$ based on a difference between the motor current $i_{motor}$ and the one of the velocity control target current $i_{target-VC}$, the torque control target current $i_{target-TC}$, or the open loop target current $i_{target-OL}$. The current comparator 904 is further configured to provide the current error $i_{error}$ to the torque controller 906.

The torque controller 906 is configured to receive the current error $i_{error}$ and to generate a motor control signal $v_{control}$ (e.g., a voltage control signal) based on the current error $i_{error}$. The torque controller 906 is further configured to provide the motor control signal $v_{control}$ to the first input 114a of the drive current generation circuitry 114, and the drive current generation circuitry 114 is configured to generate the drive current $i_{drive}$ based, in part, on the motor control signal $v_{control}$. In some examples, the torque controller 906 is a PI controller.

Figure 10:
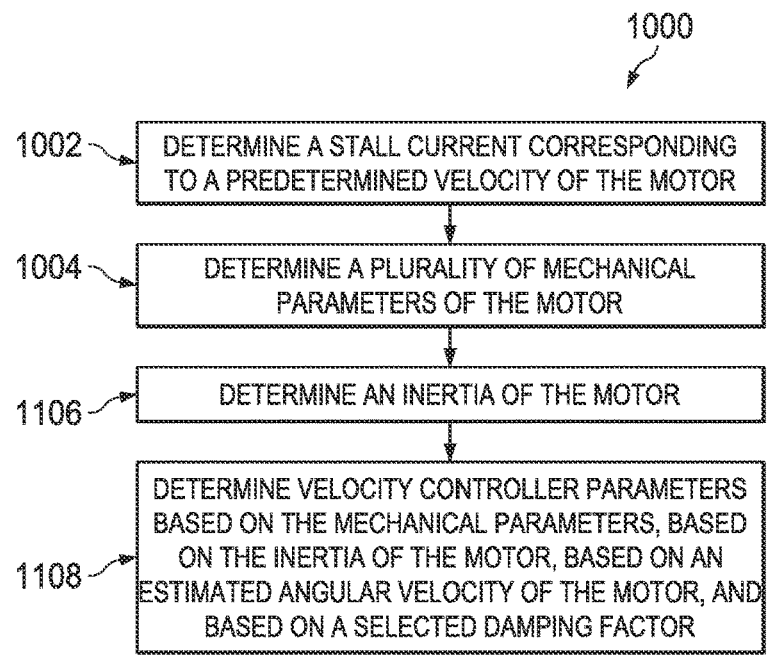
FIG. 10 is a flow diagram of an example method for controlling a motor.

FIG. 10 is a flow diagram of an example method 1000 for controlling a motor.

At 1002, the method includes determining a stall current corresponding to a predetermined velocity of the motor. For more details, see, for example, FIGS. 2 and 11 and the portions herein relating to these figures.

At 1004, the method includes determining a plurality of mechanical parameters of the motor. For more details, see, for example, FIGS. 6 and 12 and the portions herein relating to these figures.

At 1006, the method includes determining an inertia of the motor. For more details, see, for example, FIGS. 6 and 13 and the portions herein relating to these figures.

At 1008, the method includes determining velocity controller parameters based on the mechanical parameters, based on the inertia of the motor, based on an estimated angular velocity of the motor, and based on a selected damping factor. For more details, see, for example, FIGS. 1, 8, and 14 and the portions herein relating to these figures.

Figure 11:
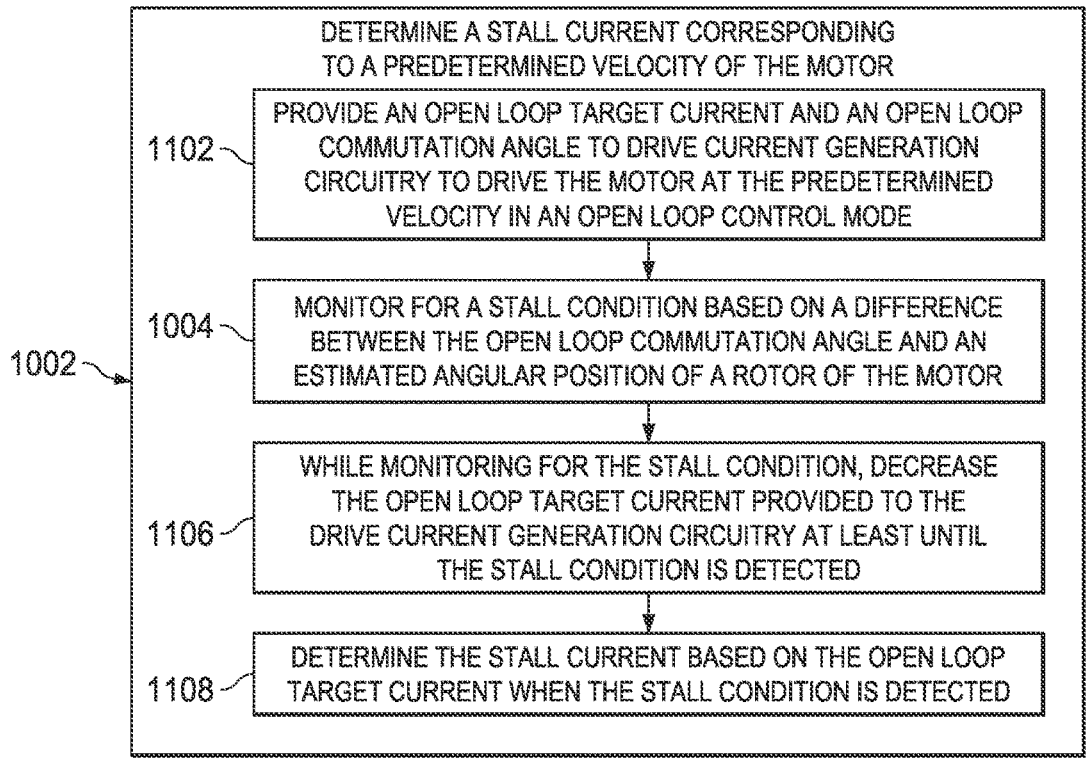
FIG. 11 is a flow diagram of an example method for determining the stall current corresponding to a predetermined velocity of a motor.

FIG. 11 is a flow diagram of an example method 1002 for determining the stall current corresponding to a predetermined velocity of the motor.

At 1102, the method includes providing an open loop target current and an open loop commutation angle to drive current generation circuitry to drive the motor at the predetermined velocity in an open loop control mode. In the example of FIG. 8, the open loop target current generation circuitry 208 is configured to provide the open loop target current $i_{target-OL}$ to the drive current generation circuitry 114 via the first switch 214. Further, the open loop angle generation circuitry 204 is configured to provide the open loop commutation angle $\theta_{OL}$ to the drive current generation circuitry 114 via the second switch 608. The drive current generation circuitry 114 is configured to output the drive current $i_{drive}$ based on the open loop target current $i_{target-OL}$ and the open loop commutation angle $\theta_{OL}$ to drive the motor 104 at the predetermined velocity in the open loop control mode.

At 1104, the method includes monitoring for a stall condition based on a difference between the open loop commutation angle and an estimated angular position of a rotor of the motor. For example, the stall condition detection circuitry 212 is configured to receive the open loop commutation angle $\theta_{OL}$, to receive the estimated angular position $\theta_{est}$, and to monitor for the stall condition based on the difference between the two.

At 1106, while monitoring for the stall condition, the method includes decreasing the open loop target current provided to the motor at least until the stall condition is detected. For example, the open loop target current generation circuitry 208 is configured to decrease the magnitude of the open loop target current $i_{target-OL}$ while the stall condition detection circuitry 212 is monitoring for the stall condition.

At 1108, the method includes determining the stall current based on the open loop target current when the stall condition is detected. For example, the stall current determination circuitry 210 is configured to receive a stall signal from the stall condition detection circuitry 212 when the stall condition is detected, and to determine the stall current $i_{stall}$ based on the open loop target current $i_{target-OL}$ when the stall condition is detected (e.g., when the stall signal STALL is received).

Figure 12:
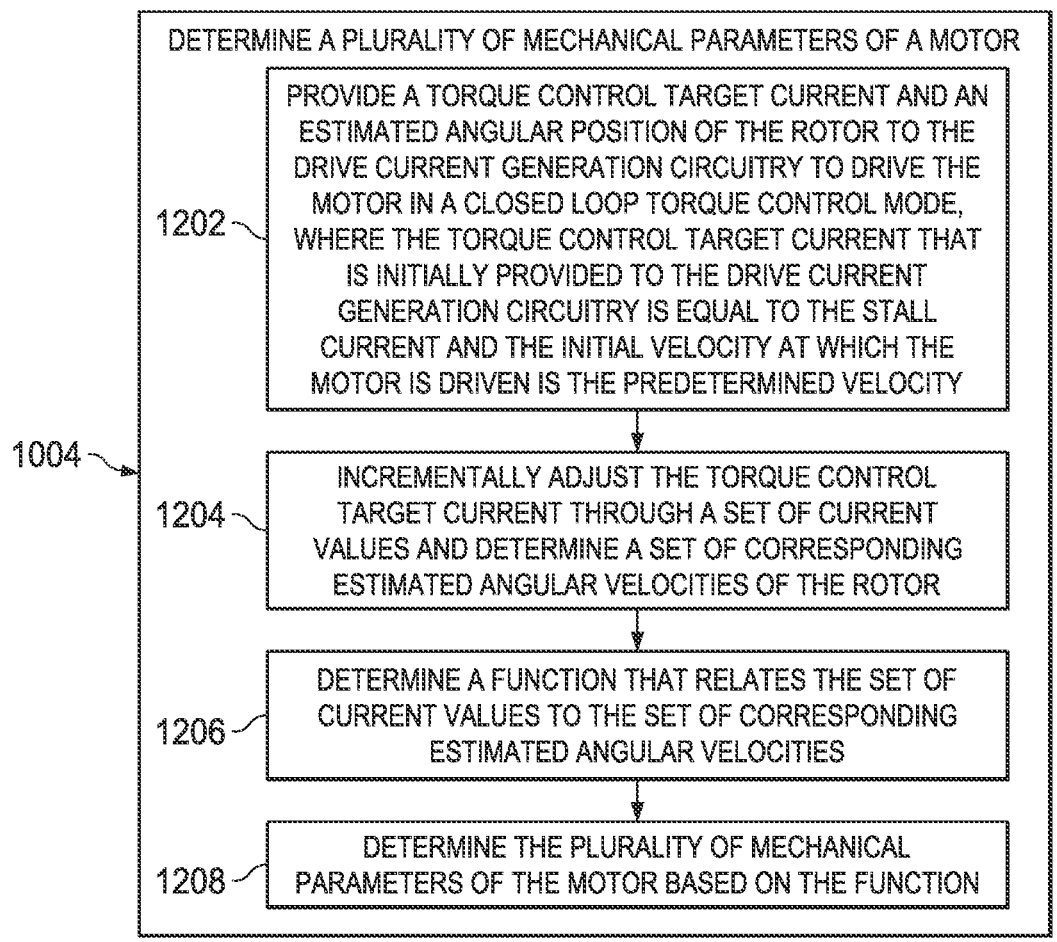
FIG. 12 is a flow diagram of an example method for determining mechanical parameters of a motor.

FIG. 12 is a flow diagram of an example method 1004 for determining the mechanical parameters of a motor.

At 1202, the method includes providing a torque control target current and an estimated angular position of the rotor to the drive current generation circuitry to drive the motor in a closed loop torque control mode. The torque control target current that is initially provided to the motor is set to the stall current. The initial velocity at which the motor is driven is the predetermined velocity. For example, the torque control target current generation circuitry 604 is configured to provide the torque control target current $i_{target-TC}$ to the drive current generation circuitry 114 via the first switch 214. Further, angular position estimation circuitry 202 is configured to provide the estimated angular position $\theta_{est}$ to the drive current generation circuitry. The drive current generation circuitry 114 is configured to output the drive current based on the torque control target current $i_{target-TC}$ and the estimated angular position $\theta_{est}$ to drive the motor 104 in the closed loop torque control mode.

At 1204, the method includes incrementally adjusting the torque control target current through a set of current values and determining a set of corresponding estimated angular velocities of the rotor. For example, the torque control target current generation circuitry 604 is configured to incrementally adjust (e.g., increase and/or decrease) the torque control target current $i_{target-TC}$ through the set of current values and the angular velocity estimation circuitry is configured to determine the set of corresponding estimated angular velocities.

At 1206, the method includes determining a function that relates the set of current values to the set of corresponding estimated angular velocities. For example, the mechanical parameter determination circuitry 602 is configured to determine the function, such as equation 2, based on a line or curve of best fit of the set of current values versus the set of corresponding velocities.

At 1208, the method includes determining the plurality of mechanical parameters of the motor based on the function. For example, the mechanical parameter determination circuitry 602 is configured to determine the mechanical parameters based on the function, as described with regard to equation 2.

Figure 13:
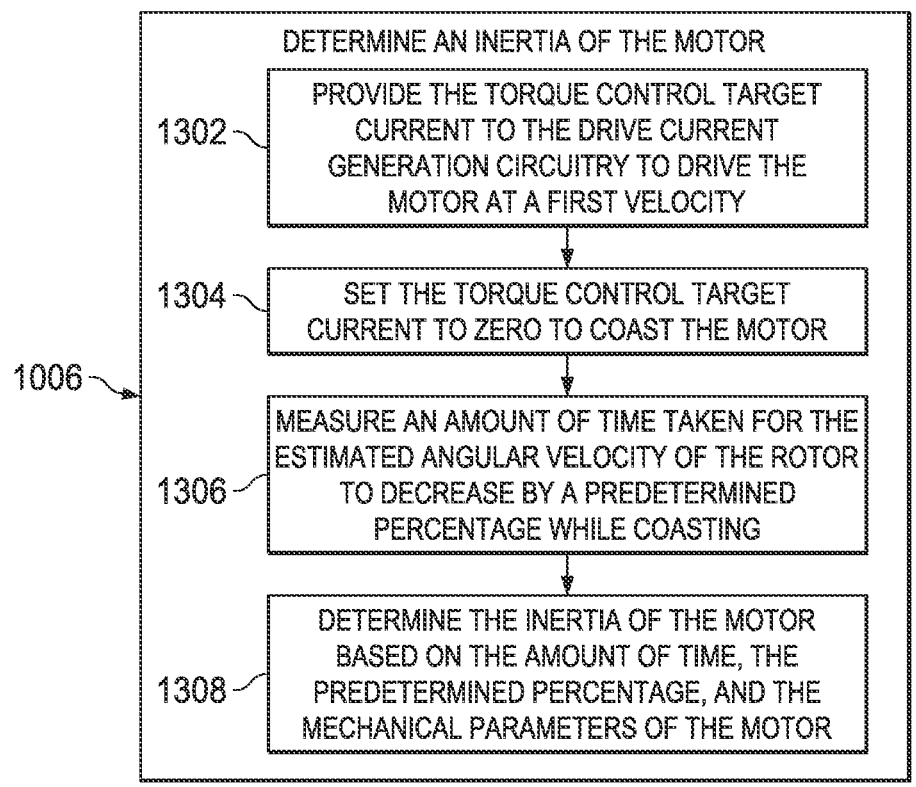
FIG. 13 is a flow diagram of an example method for determining an inertia of a motor.

FIG. 13 is a flow diagram of an example method 1006 for determining the inertia of the motor.

At 1302, the method includes providing the torque control target current to the drive current generation circuitry to drive the motor at a first velocity. For example, the torque control target current generation circuitry 604 is configured to provide a torque control target current $i_{target-TC}$ to the drive current generation circuitry 114 to drive the motor 104 at some non-zero velocity.

At 1304, the method includes setting the torque control target current to zero to coast the motor. For example, the torque control target current generation circuitry 604 is configured to set the magnitude of the torque control target current $i_{target-TC}$ to zero to coast the motor 104.

At 1306, the method includes measuring an amount of time taken for the estimated angular velocity of the motor to decrease by a predetermined percentage while coasting. For example, the mechanical parameter determination circuitry 602 is configured to measure the amount of time taken for the estimated angular velocity $\theta_{est}$, which is determined by the angular velocity estimation circuitry 108 while the motor is coasting, to decrease by a predetermined percentage while coasting.

At 1308, the method includes determining the inertia of the motor based on the amount of time, the predetermined percentage, and the mechanical parameters of the motor. For example, the mechanical parameter determination circuitry 602 is configured to determine the inertia of the motor 104 using equations 3 through 6.

Figure 14:
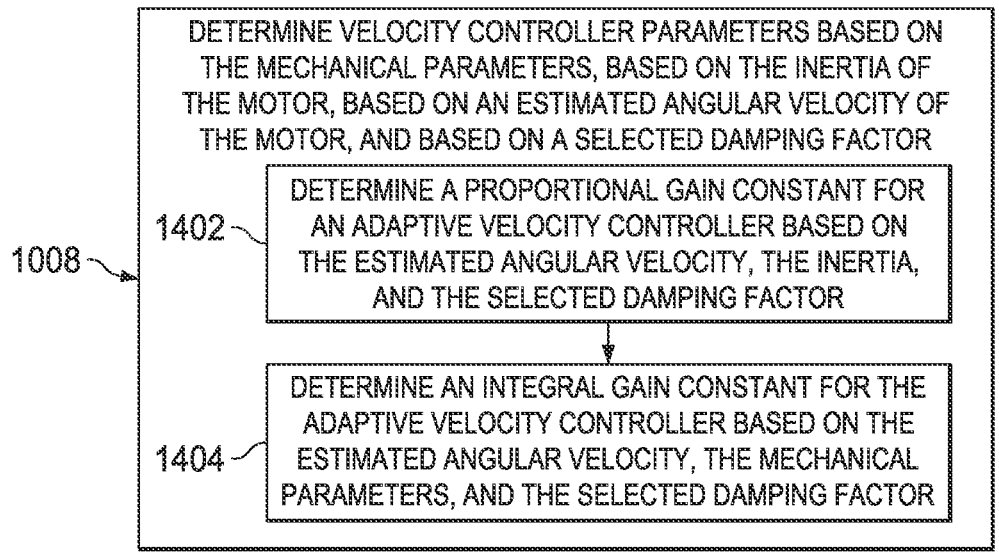
FIG. 14 is a flow diagram of an example method for determining velocity controller parameters.

FIG. 14 is a flow diagram of a method 1008 for determining the velocity controller parameters.

At 1402, the method includes determining a proportional gain constant for an adaptive velocity controller based on the estimated angular velocity, the inertia, and the selected damping factor. For example, the controller parameter determination circuitry 116 is configured to determine the proportional gain constant $K_p$ for the adaptive velocity controller 112 at a given time based on equations 10 and 15.

At 1404, the method includes determining an integral gain constant for the adaptive velocity controller based on the estimated angular velocity, the mechanical parameters, and the selected damping factor. For example, the controller parameter determination circuitry 116 is configured to determine the integral gain constant $K_i$ for the adaptive velocity controller 112 at the given time based on equations 11 and 15.

Thus, the present description relates to a motor controller and a method for controlling a motor to determine a stall current of the motor, to determine mechanical parameters of the motor, to determine an inertia of the motor, and to determine adaptive velocity controller parameters.

The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or embodiments of this description. Further, one or more of the acts or events depicted herein may be performed in one or more separate acts and/or phases. In some embodiments, the methods described above may be implemented in a computer readable medium using instructions stored in a memory.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described examples, and other implementations are possible, within the scope of the claims.

What is claimed is:

1. A motor controller operable to control a motor, comprising:
   drive current generation circuitry having an output coupled to the motor;
   a velocity control path including:
   angular velocity estimation circuitry having an input adapted to be coupled to the motor;
   a velocity comparator having first input coupled to a target velocity input and a second input coupled to an output of the angular velocity estimation circuitry; and
   an adaptive velocity controller having a first input coupled to an output of the velocity comparator and having an output coupled to a first input of the drive current generation circuitry;
   a controller parameter determination circuitry having a first input coupled to the output of the angular velocity estimation circuitry, having a second input, and having an output coupled to a second input of the adaptive velocity controller; and
   mechanical parameter determination circuitry having an input coupled to the output of the angular velocity estimation circuitry and having an output coupled to the second input of the controller parameter determination circuitry.

2. The motor controller of claim 1, further comprising:
   a first switch; and target current generation circuitry having an output coupled to the first switch,
wherein the first switch selectively couples either the output of the adaptive velocity controller or the output of the target current generation circuitry to the first input of the drive current generation circuitry.

3. The motor controller of claim 2, wherein the mechanical parameter determination circuitry is coupled to the target current generation circuitry.

4. The motor controller of claim 2, further comprising:
a second switch coupled to a second input of the drive current generation circuitry;
angular position estimation circuitry having an input adapted to be coupled to the motor and having an output coupled to the second switch; and
open loop angle generation circuitry having an output coupled to the second switch,
wherein the second switch selectively couples either the output of the angular position estimation circuitry or the output of the open loop angle generation circuitry to the second input of the drive current generation circuitry.

5. The motor controller of claim 4, further comprising:
stall current determination circuitry having an output coupled to an input of the target current generation circuitry; and
stall condition detection circuitry having a first input coupled to the output of the angular position estimation circuitry, having a second input coupled to the output of the open loop angle generation circuitry, and having an output coupled to an input of the stall current determination circuitry.

6. A method for controlling a motor having a rotor, the method comprising:
determining an estimated angular velocity of the rotor;
determining an inertia of the motor;
determining a set of controller parameters based on the estimated angular velocity, the inertia, and a plurality of mechanical parameters of the motor;
generating a velocity control signal based on the set of controller parameters and a difference between a target velocity and the estimated angular velocity; and
generating a driving current for driving the motor based on the velocity control signal.

7. The method of claim 6, further comprising:
incrementally adjusting the driving current through a set of current values;
determining a set of corresponding estimated angular velocities of the rotor, wherein each estimated angular velocity of the set of corresponding estimated angular velocities corresponds to a current value of the set of current values; and
determining the plurality of mechanical parameters of the motor based on the set of current values and the set of corresponding estimated angular velocities.

8. The method of claim 6, further comprising:
selecting a damping factor; and
determining the set of controller parameters further based on the selected damping factor.

9. The method of claim 6, wherein the set of controller parameters includes a proportional gain constant and integral gain constant pair.

10. A motor controller operable to control a motor, comprising:
drive current generation circuitry configured to generate a driving current for driving the motor based on a velocity control signal;
angular velocity estimation circuitry adapted to be coupled to the motor and configured to determine an estimated angular velocity of a rotor of the motor;
an adaptive velocity controller selectively coupled to the drive current generation circuitry, the adaptive velocity controller configured to generate the velocity control signal based on a set of controller parameters and a difference between a target velocity and the estimated angular velocity;
controller parameter determination circuitry coupled to the adaptive velocity controller, the controller parameter determination circuitry configured to determine the set of controller parameters for the adaptive velocity controller based on the estimated angular velocity and a plurality of mechanical parameters of the motor; and
mechanical parameter determination circuitry coupled to the controller parameter determination circuitry and to the angular velocity estimation circuitry and configured to determine the plurality of mechanical parameters of the motor.

11. The motor controller of claim 10, wherein the mechanical parameter determination circuitry is further configured to determine an inertia of the motor, and wherein the adaptive velocity controller is further configured to generate the velocity control signal based on the inertia.

12. The motor controller of claim 10, wherein the controller parameter determination circuitry is further configured to determine the set of controller parameters further based on a damping factor.

13. The motor controller of claim 10, wherein the set of controller parameters includes a proportional gain constant and integral gain constant pair.

* * * * *